United States Patent
Gavrilov et al.

(10) Patent No.: US 7,295,361 B2
(45) Date of Patent: Nov. 13, 2007

(54) METHOD FOR PRODUCING AN ELECTROCHROMIC DEVICE AND SAID ELECTROCHROMIC DEVICE

(75) Inventors: Vladimir Ivanovich Gavrilov, Moskovskaya obl. (RU); Igor Victorovich Shelepin, Moskovskaya obl. (RU)

(73) Assignee: Close Joint Stock Company "Technoglass Engineering", Moscow (RU)

( * ) Notice: Subject to any disclaimer, the term of this patent is extended or adjusted under 35 U.S.C. 154(b) by 33 days.

(21) Appl. No.: 10/528,879

(22) PCT Filed: Sep. 19, 2003

(86) PCT No.: PCT/RU03/00414

§ 371 (c)(1),
(2), (4) Date: Mar. 23, 2005

(87) PCT Pub. No.: WO2004/029710

PCT Pub. Date: Apr. 8, 2004

(65) Prior Publication Data

US 2006/0050357 A1    Mar. 9, 2006

(30) Foreign Application Priority Data

Sep. 26, 2002  (RU) .............. 2002125637

(51) Int. Cl.
*G02F 1/07*    (2006.01)

(52) U.S. Cl. ..................................... 359/265

(58) Field of Classification Search ............. 359/296, 359/265; 345/107, 105, 49
See application file for complete search history.

(56) References Cited

U.S. PATENT DOCUMENTS 5,888,431 A * 3/1999 Tonar et al. ............. 252/583

\* cited by examiner

*Primary Examiner*—Ricky Mack
*Assistant Examiner*—Joseph Martinez
(74) *Attorney, Agent, or Firm*—Lackenbach Siegel, LLP

(57) ABSTRACT

The invention relates to a method for producing electrochromic devices, in particular that having a large working surface area and which does not produce a volumetric shrinkage and can operate during a long maintenance of electrocoloured state of an electrochromic compound, high control voltages and polarity inversion. The inventive electrochromic device comprises at least two electrodes (1, 2), at least one of them being optically transparent. A closed sealed space is formed between said electrodes and filled with the electrochromic compound which is embodied in the form of a solid-like film. The inventive method for producing the electrochromic device consists in prefabricating an initial electrochromic compound in the form of a dispersed electrochromic system which contains at least a suspension and/or colloid. The dispersed medium of said system is embodied in the form of an electrochromic solution containing a liquid solvent, cathode and anode components, a disperse phase being embodied in the form of a finely dispersed polymer. Afterwards, the initial electrochromic compound is deaerated, thereby eliminating dissolved oxygen and air introduced by said finely dispersed polymer, and is used for filling the space between the electrodes.

21 Claims, 1 Drawing Sheet

METHOD FOR PRODUCING AN ELECTROCHROMIC DEVICE AND SAID ELECTROCHROMIC DEVICE

PRIOR PATENT APPLICATIONS

This application claims priority to Russian patent application RU 2002125637, filed Sep. 26, 2002 and PCT patent application PCT/RU2003/000414, filed Sep. 19, 2003, which references are incorporated herein in their entireties by reference thereto.

TECHNICAL FIELD

The present invention relates to devices ensuring colour change (colouring or bleaching) under the action of electric current, namely, to electrochromic devices and the technology for their manufacture. Electrochromic devices have an electrically controlled light absorption or reflection. These devices include anti-glare rear-view mirrors in automobiles, light ports, dimming visors, smart windows, multiple-access display boards, etc.

BACKGROUND OF THE INVENTION

A method is known for producing an electrochromic device (U.S. Pat. No. 4,902,108, 20 Feb. 1990), wherein a thickened solution of polymethyl methacrylate in a low-boiling solvent is applied onto a conducting layer of one of two optically transparent electrodes, then the solvent is evaporated to give a polymethyl methacrylate layer. Thereafter the optically transparent electrodes are glued together along the perimeter at a specified distance from each other and a closed space between them is filled, through a hole (holes) in the glue line, by an electrochromic solution comprising cathodic and anodic components and an inert electrolyte in a high-boiling solvent, and the said space is sealed. The said polymethyl methacrylate layer dissolves and thickens the electrochromic solution, that results in decreasing appreciably the adverse effect of the gravitation-induced "stratification" of the electrocoloured form of the composition. Thus, the proper electrochromic composition is prepared only after completion of the assembling the said electrochromic device, that restricts the workability of the device as a whole. The electrochromic composition is a liquid phase with a variable viscosity, determined by the amount of the thickening polymer. The inert electrolyte added to the electrochromic solution ensures the electrical conduction of the latter in the case where the cathodic and anodic components are not ionized on dissolution.

A method is known for producing of an electrochromic device (U.S. Pat. No. 5,471,337, 28 Nov. 1995), wherein closed space between electrodes is filled with an electrochromic disperse system, consisting of a dispersion medium, in the form of a solvent thickened preferably with polymethyl methacrylate or a solvent-plasticized polymer, and a disperse phase, comprising a cathodic component such as polyoxometallate and an anodic component. Since polyoxometallate is an inorganic electrochromic component and, therefore, it has a lower extinction coefficient than organic electrochromic components, thus prepared electrochromic device does not ensure a sufficient efficiency of light attenuation without a substantial energy consumption.

A method is known for producing an electrochromic device (RU 2144937 C1, 27 Jan. 2000), wherein closed space between the electrodes is filled with an electrochromic disperse system, the said system is a suspension and consists of a dispersion medium in the form of an electrochromic solution, comprising cathodic and anodic components, and a solvent, as well as a disperse phase in the form of a finely dispersed polymer; the space is sealed and the electrochromic disperse system is kept until the polymer dissolves. This method allows producing rather easily an electrochromic device with a broad range of viscosities of the electrochromic composition up to a solid-like film, which prevents "stratification" of the electrocoloured forms of the components of the said composition and reduces the risk of contact with the electrochromic composition on accidental destruction of such device. However, on long-term exposure to a voltage and, especially on changing the polarization polarity after such an exposure, as well as on the application of high voltages (more than 2 V), "spots", i.e., areas that differ in the colour and/or colour intensity from the background, appear in the electrochromic composition of the known electrochromic device (RU 2144937 C1, 27 Jan. 2000). This adverse effect is mainly typical for electrochromic devices having a large work surface area of optically transparent $SnO_2$:F-electrodes. Besides, in the process of producing the electrochromic device, after dissolution of the polymer and clarification of the electrochromic composition, air bubbles appear over the whole work surface of the device, which makes the device unserviceable.

Methods are known for producing an electrochromic device, the methods including steps of producing a solid-like film of the electrochromic composition directly in the device by polymerization and/or cross-linking polymerization of the chains in monomer compositions by means of various initiators (EP 0612826 A1, 31 Aug. 1994; WO 97/34186, 18 Sep. 1997; WO 98/42796, 1 Oct. 1998). However, polymerization reactions are accompanied by volume shrinkage, which has an adverse effect on the quality of the electrochromic device. The adverse effect can become apparent especially in electrochromic devices with relatively large inter-electrode gaps (1-2 mm), which are usually provided in electrochromic devices with large work surfaces (more than 0.5 $m^2$).

SUMMARY OF THE INVENTION

It is an object of the present invention to provide an electrochromic device, having an electrochromic composition in the form of a polymer layer, in particular, a solid-like one, exhibiting no volume shrinkage during structuring over a broad temperature range and ensuring a higher stability of the electrochromic device operating under long-term maintenance of the coloured state and under high control voltages and changing of the electrode polarity. The higher stability implies a longer persistence of the colouring and bleaching uniformity, especially for an electrochromic device with a large work surface area.

The present invention provides a method for producing an electrochromic device comprising at least two electrodes, at least one of them being optically transparent, and a tightly closed space between the electrodes being filled with the electrochromic composition, the method including the steps of preparing an initial electrochromic composition in the form of an electrochromic disperse system comprising, at least, a suspension and/or colloid, wherein a dispersion medium is an electrochromic solution including a liquid solvent, a cathodic component and an anodic component, and a disperse phase is a finely dispersed polymer;

deaerating the initial electrochromic composition in order to eliminate the dissolved oxygen and air introduced with the finely dispersed polymer;

filling the closed space between the electrodes with the deaerated initial electrochromic composition;

sealing the closed space between the electrodes.

The electrochromic solution may additionally comprise an inert electrolyte. The electrolyte concentration is 0.005M-0.5M.

Deaeration of the initial electrochromic composition for the removal of dissolved oxygen and air introduced together with the finely dispersed polymer can be performed by evacuation.

The finely dispersed polymer is preferably taken in an amount that ensures forming a solid-like layer of the electrochromic composition, which gives no volume shrinkage during polymer dissolution in the said electrochromic solution over a broad temperature range.

The finely dispersed polymer is a linear polymer, in particular, high-molecular linear polymer, for example, a copolymer of methyl methacrylate and methacrylic acid and/or a copolymer of methyl methacrylate, methacrylic acid, and calcium methacrylate.

The liquid solvent is an individual chemical compound or a mixture of chemical compounds.

The cathodic component is an individual organic electrochromic compound exhibiting at least one reversible reduction wave in a voltammogram, or a mixture of organic electrochromic compounds that exhibit at least one reversible reduction wave in a voltammogram, while the anodic component is an individual electrochromic organic compound exhibiting at least one reversible oxidation wave in a voltammogram, or a mixture of organic electrochromic compounds that exhibit at least one reversible oxidation wave in a voltammogram.

The concentrations of the cathodic and anodic components range from 0.001M to 0.2M, preferably 0.01M-0.1M.

In addition, the cathodic component is preferably a quaternary salt of dipyridinium or dipyridinium derivatives, or a mixture of salts.

The anodic component is a metallocene. Preferably anodic component is a ferrocene, its derivatives or mixtures thereof. Also the anodic component may be 5,10-dihydro-5,10-dimethylphenazine, its derivatives or mixtures thereof.

To extend the time of existence of the disperse system as a suspension and/or colloid, the dispersion medium is cooled down prior to introducing the disperse phase.

To increase the quality of the produced electrochromic device, the closed space between the electrodes is deaerated before being filled with the initial electrochromic composition, for example, by purging with an inert gas.

The present invention also provides for an electrochromic device, comprising, at least, two electrodes, at least, one of them being optically transparent, the space between the electrodes being tightly closed and filled with an electrochromic composition, the electrochromic device being produced by the above method.

The electrochromic composition of the said electrochromic device can additionally contain an UV-stabilizing additive.

PREFERRED EMBODIMENTS OF THE INVENTION

Figure 1:
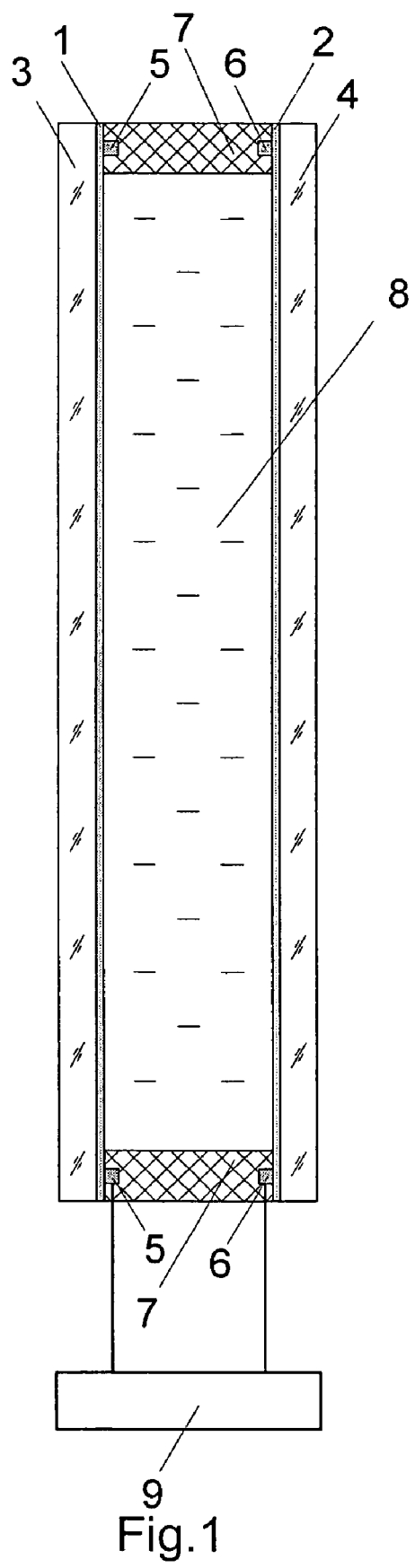
FIG. 1 is a sectional view of an embodiment of the electrochromic device having two optically transparent electrodes.

The electrochromic device is produced using optically transparent electrodes, each of them is a glass or polymeric (in particular, polyethylene terephthalate) substrate, one side of which is coated with a transparent conducting layer of doped indium oxide $In_2O_3$ or doped tin oxide $SnO_2$. The electrodes are bonded together, preferably, by an adhesive joint, along the perimeter in such a way as to ensure a specified distance between them; the conducting layers are located inside the closed space defined by the electrodes and the adhesive joint. The adhesive joint may be a glue line, which comprises as a rule, spacers for fixing the specified distance between the electrodes. A two-sided adhesive tape can also be used for making the adhesive joint if the thickness of the backing of the tape corresponds to the specified distance between the electrodes. Along the outer perimeter of the adhesive joint or along the longest sides of the electrodes, feed wires are arranged. The feed wires may also be positioned inside the adhesive joint, the conductors being brought outside. One or more openings are left in the adhesive joint for filling the closed space between the electrodes with the initial electrochromic composition. After filling, the openings are plugged by an inert sealing material.

The electrochromic device may be produced using the known technology of the cast triplex.

The initial electrochromic composition is an electrochromic disperse system comprising at least a suspension and/or colloid (depending on the particle size of a disperse phase), which is produced by mixing a dispersion medium and a disperse phase.

The dispersion medium of the electrochromic disperse system is an electrochromic solution comprising a liquid solvent, a cathodic component, an anodic component and, if necessary, an inert electrolyte. The liquid solvent is either an individual chemical compound, for example, gamma-butyrolactone or propylene carbonate, or a mixture of chemical compounds, for example, a mixture of the said substances.

Organic electrochromic compounds having high extinction coefficients of the electroactive forms are used as the cathodic and anodic components. The use of organic electrochromic systems also allows a substantial decrease in the light transmission in the UV-region upon the electrically induced colouring, that markedly improves the performance of light dimming electrochromic devices.

In the general case, the cathodic component is an individual organic electrochromic compound or a mixture of organic electrochromic compounds capable of reversible reduction in the cathodic region of potentials, i.e., those having at least one reversible reduction wave in a voltammogram. The preferable cathodic component is the quaternary salt of dipyridinium or its derivatives or a mixture of salts. Quaternary salts of dipyridinium or its derivatives may be represented by 4,4'-dipyridinium, 2,2'-dipyridinium, bis-1,1'-dipyridinium (with nitrogen atoms linked by a C1-C10 alkylene group), and bis-2,2'-pyridinium or bis-4,4'-pyridinium (with a linking phenylene or a keto-group) perchlorates, tetrafluoroborates, or hexafluorophosphates respectively. The pyridine rings in dipyridines can be quaternized by independent alkyl groups with 1-10 carbon atoms; phenyl and benzyl groups; phenyl or benzyl groups having 1-4-carbon alkyl substituents in different positions at any carbon atom in the benzene ring, halogens (Cl, Br, I), alkoxy groups or cyano groups and alkylene binding groups with 2-4 carbon atoms for 2,2'-dipyridinium derivatives. In addition, the pyridine rings can contain different substituents at carbon atoms in different positions at the carbon atoms of the benzene ring, e.g., alkyl groups with 1-4 carbon atoms, the phenyl group, phenyl groups with alkyl substituents, halogens (Cl, Br, I), the cyano group, and alkoxy groups.

In the general case, the anodic component is an individual organic electrochromic compound or a mixture of such compounds capable of reversible electrooxidation in the anodic region of potentials, i.e., those having at least one reversible oxidation wave in a voltammogram.

The preferable anodic component is a metallocene. The more preferable anodic component is a ferrocene, its derivatives, or mixtures thereof.

Ferrocene derivatives may be compounds including one or two substituents, independent from each other, in the cyclopentadienyl ring or rings, in particular, 1-10-carbon alkyl groups; phenyl groups; alkylphenyl groups with 1-4-carbon alkyl groups; alkoxy groups with 1-10 carbon atoms; alkoxyphenyl groups with 1-4-carbon alkoxy groups; benzyl groups; alkylbenzyl groups with 1-4-carbon alkyl groups; halogenidphenyl groups; phenylcarboxy, nitrophenyl, carboxamide, acyl, aryloyl or acyl(aryl)alkyl groups; and other. The mixture of mono-, di- and tri-tert-butylferrocenes obtained in accordance with specifications TU 38-103219-88 can also be used.

5,10-Dihydro-5,10-dimethylphenazine, its derivatives, or mixtures thereof can also be taken as the anodic component.

The use of blend compositions ensures, for each particular electrochromic solution, definite spectral characteristics or colours and colour tones of the electroactivated state of the electrochromic composition in the inter-electrode space. For example, to attain a green colour of the electrochromic composition in the electroactivated state, 1,1'-dibenzyl-4,4'-dipyridinium diperchlorate is used as the cathodic component and 5,10-dihydro-5,10-dimethylphenazine is used as the anodic component. Neutral gray is attained with a mixture of 1,1'-dibenzyl-4,4'-dipyridinium diperchlorate and 1,1'''-(1,3-propanediyl)bis[1'-methyl-4,4'-bipyridinium] tetraperchlorate as the cathodic component and 5,10-dihydro-5,10-dimethylphenazine as the anodic component. For getting a violet colour of the electrochromic composition in the electroactivated state, 1,1'-dimethyl-4,4'-dipyridinium diperchlorate is taken as the cathodic component, while a mixture of N-phenylphenoxazine and ferrocene is used as the anodic component.

The presence of the inert electrolyte introduced additionally in the dispersion medium promotes speeding up of bleaching of the electroactivated electrochromic device and prevents deteriorating of colouring/bleaching uniformity after operation of the electrochromic device under long-term polarization with direct voltage and/or after the action of a high voltage. Known salts such as alkali and alkaline earth metal perchlorates, tetrafluoroborates or hexafluorophosphates respectively as well as salts of tetraalkylammonium with 1-4-carbon alkyl groups are used as inert electrolytes.

Optionally, an UV-stabilizing additive can be added to the dispersion medium. Compounds of a class of benzene, benzophenone, and acrylate and mixtures thereof can be used as stabilizing additives. 2-Ethylenehexyl-2-cyano-3,3-diphenylacrylate, 2-hydroxy-4-methoxybenzophenone, 2,2'-dihydroxy-4-methoxybenzophenone, or mixtures thereof are preferable.

After dissolution, all components of the dispersion medium form a true solution. The concentrations of the cathodic and anodic components are dictated by the type of electrochromic device and the specified electrooptical parameters; therefore, they can vary over a broad ranges, from 0.001M to 0.2M. The preferable concentrations of the cathodic and anodic components are 0.01M-0.1M. The amount of the electrolyte added can be 0.005M-0.5M. The content of the UV-stabilizing additive varies from 0.02M to 0.2M.

The disperse phase of the electrochromic disperse system is a finely dispersed polymer. As finely dispersed polymers capable of forming a suspension and/or colloid in an electrochromic solution, one can use homo- and copolymers of vinyl chloride with alkyl phthalates and chlorinated hydrocarbons; cellulose acetates with diethyl phthalate and glycols; cellulose nitrate with dibutyl phthalate; polyvinylbutyral with ethylene glycol, etc. A finely dispersed linear high-molecular polymer is preferred. Examples of such a polymer are the high-molecular (molecular weight of up to $10^6$) methyl methacrylate/methacrylic acid copolymer (trade name Vitan-2M) manufactured according to specifications TU 6-01-1174-91 and the methyl methacrylate/methacrylic acid/calcium methacrylate copolymer (trade name Vitan-OS) manufactured according to specifications TU 6-02-128-96. The particle size of both polymers does not exceed $6 \times 10^{-5}$ m.

The amount of the disperse phase is determined by the desired viscosity of the electrochromic composition and, therefore, it can range over broad limits, from 0.9 to 40% wt of the initial electrochromic composition.

Preferably, the amount of the finely dispersed polymer is sufficient for preparing a solid-like (i.e., possessing no fluidity) layer of the electrochromic composition, which results from structuring of the initial electrochromic composition during dissolution of the disperse phase in the dispersion medium. In this case, the process of forming the solid-like layer occurs without any volume shrinkage. Such electrochromic layer markedly increases the overvoltage of the irreversible electrode reactions accompanied by gas release, that ensures the stability of the electrochromic device against the action of high voltage (above 2 V).

The initial electrochromic composition in the form of a suspension and/or colloid, as mentioned above, is subjected to deaeration to eliminate the dissolved oxygen and air introduced together with the finely dispersed polymer in the process of preparing the electrochromic composition. The deaeration (performed, for example, by evacuation) promotes increasing the uniformity of the initial electrochromic composition and, hence, the uniformity of its colouring and bleaching.

The quality of the produced electrochromic device is also increased by deaeration of the closed space between two electrodes, for example, by purging with an inert gas or evacuation.

In order to extend the period of existence of the disperse system as a suspension and/or a colloid, the initial electrochromic composition is cooled down, that decreases the rate of dissolution of finely dispersed polymer in the electrochromic solution.

The closed space between the electrodes is filled by the initial electrochromic composition through one or more openings left in the adhesive joint. Since the initial electrochromic composition is not transparent, the electrochromic device becomes dim immediately after filling. However, after some period (several minutes to several hours depending on the temperature, polymer concentration and the solvent) needed for completing the dissolution process of the finely dispersed polymer in the electrochromic solution, the electrochromic layer becomes transparent. The filled closed space between the two electrodes can be sealed either immediately after filling, or during the transition of the initial electrochromic solution into the transparent final state, or after completion of this process. To accelerate the transition of the initial electrochromic composition into the transparent state, the device is heated to a temperature not exceeding 90° C.

Figure 2:
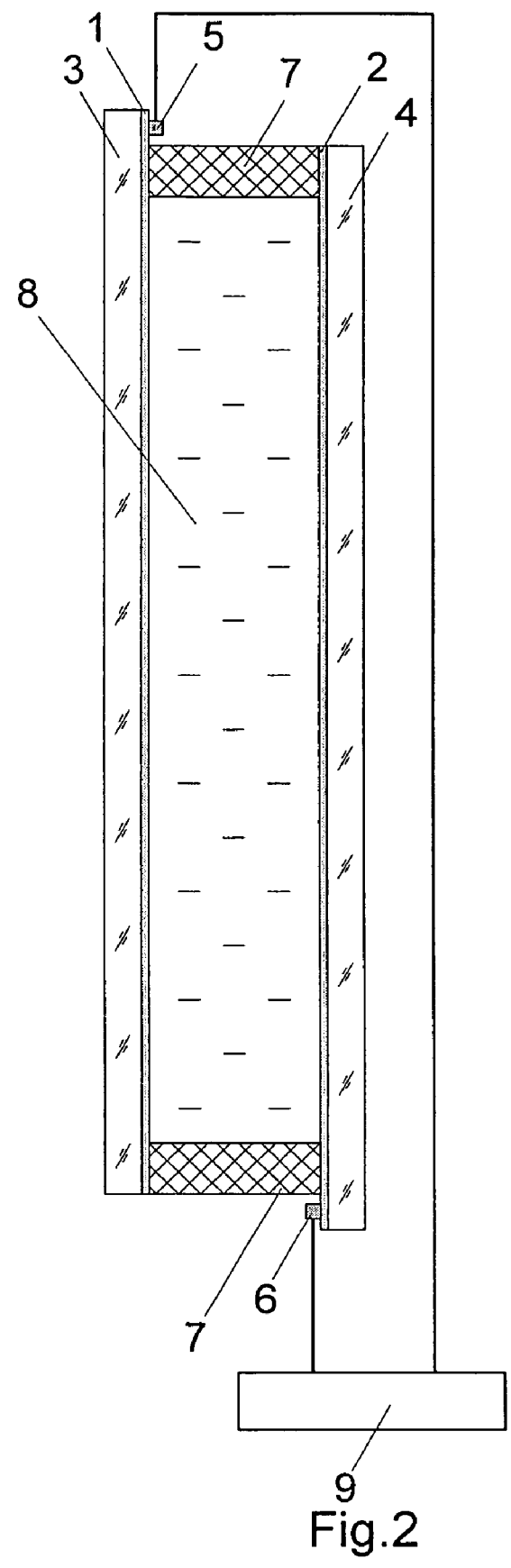
FIG. 2 is a sectional view of an embodiment of the electrochromic device having two optically transparent electrodes displaced.

The electrochromic device (FIG. 1 or FIG. 2) comprises two optically transparent electrodes 1 and 2 applied onto substrates 3 and 4, respectively. In most cases, substrates 3 and 4 are glass plates or polymer films, the surface area of which is determined by the particular application of the electrochromic device. In electrochromic mirrors or in the electrochromic devices for data display means, it is admissible to use only one optically transparent electrode.

Along the longer sides of substrates 3 and 4 over the surface of optically transparent electrodes 1 and 2, feed wires 5 and 6 are laid. Substrates 3 and 4 are bonded together along the perimeter by adhesive joint 7 to give a closed space. The adhesive joint 7 can be, in particular, a glue line or a two-sided adhesive tape of the VHB type (manufactured by Minnesota Mining & Manufacturing Company). In this case feed wire 5 or 6 between the adhesive joint 7 and electrode 1 or 2, respectively, may be made as one wire (FIG. 2) or as at least two parallel conductors (FIG. 1) to provide a reliable electric contact. When a glue line is used, spacers are arranged inside the line to ensure a specified distance between the optically transparent electrodes 1 and 2. The two-sided adhesive tape is used to produce the adhesive joint 7 if the thickness of the backing of the tape corresponds to the specified distance between electrodes 1 and 2. The closed space between electrodes 1 and 2 is filled with electrochromic composition 8 comprising optionally an UV-stabilizing additive and is sealed. The feed wires 5 and 6 are connected to control unit 9.

EXAMPLE 1

An electrochromic device comprising two optically transparent $SnO_2$ electrodes with a surface electrical resistance of 18 ohm/m$^2$ and a glass substrate thickness of 4 mm (K-glass, produced by Pilkington) was produced. The electrode dimensions were 20×30 cm$^2$. The electrodes were shifted with respect to each other to ensure the current input along the longer side and were bonded along the perimeter by an epoxide-based adhesive containing spacers to form an interelectrode gap of 0.4 mm. In the 5-mm wide glue line, an opening was left for filling the device with the initial electrochromic composition representing a disperse system in the form of a suspension, comprising the following components: a dispersion medium (electrochromic solution)—a solution of 0.01M 1,1'-dimethyl-4,4'-dipyridinium diperchlorate and 0.01M ferrocene in γ-butyrolactone; a disperse phase (20.7% wt)—the Vitan-2M copolymer. Prior to preparing the suspension, the electrochromic solution was cooled down to about 10-12° C. The inner space of the device was filled with the initial electrochromic composition by injection. After filling, the opening in the adhesive joint was sealed by an inert sealing material.

On the expiry of 1.5 h at a temperature of 20° C., the uniformly dim initial electrochromic composition became transparent. Throughout the whole area of the optical window of the device, the formation of multiple air bubbles up to 1-2 mm was observed. The bubbles did not disappear after long-term storage of the device, nor even in storage at an elevated temperature (60-70° C.).

EXAMPLE 2

The electrochromic device was produced as in Example 1 except that the initial electrochromic composition was evacuated for 12 min before filling.

On the expiry of about 1.5 h at a temperature of 20° C., the uniformly dim initial electrochromic composition became transparent without emerging any visible air bubbles and without volume shrinkage. The light transmission of the device in the visible spectral region was 78%. On application of a direct voltage of 1.5 V to the device, the electrochromic layer acquired a uniformly blue colour over the window area, while upon short-circuiting of the electrodes, the light transmission of the device returned to the initial value. After unsealing of the device, the electrochromic composition was a solid-like film.

EXAMPLE 3

Two electrochromic devices with dimensions 50×100 cm$^2$, each comprising two optically transparent $SnO_2$-electrodes with a surface electric resistance of 18 ohm/m$^2$ and a glass substrate thickness of 4 mm (K-glass) were produced. The electrodes were bonded together along the perimeter by the two-sided adhesive tape VHB 4910 with a thickness of 1 mm and a width of 6 mm with two openings for filling the device with the electrochromic disperse system. Along the longer side of each electrode, feed wires (copper conductors 0.2 mm in diameter) were laid under the adhesive tape and brought outside. The inner space of device No. 1 thus formed was filled, by injection, with the initial electrochromic composition representing a disperse system in the form of a suspension, comprising the following components: a dispersion medium (electrochromic solution)—a solution of 0.01M 1,1'-dimethyl-4,4'-dipyridinium diperchlorate and 0.01M ferrocene in a γ-butyrolactone (60% vol.)—propylene carbonate (40% vol.) mixture; a disperse phase (20.5% wt)—the Vitan-2M copolymer. Similarly, the inner space of device No. 2 was filled by the initial electrochromic composition as in device No. 1 except that the dispersion medium included additionally 0.02 M lithium perchlorate. In each case, prior to preparing the suspension, the electrochromic solutions were cooled down to 10-12° C. Prior to filling, the initial electrochromic compositions were evacuated for 15 min, while the inner spaces of devices No. 1 and No. 2 were purged with argon for 20-25 min through openings in the glue line. After filling, the openings in the glue line were sealed with an inert sealing material.

On the expiry of about 5 h at a temperature of 20° C., the uniformly dim initial electrochromic compositions in both devices became transparent without emerging any visible air bubbles or manifestation of volume shrinkage.

The feed wires of each electrode were short-circuited to perform polarizing from two sides. A 1.5 V DC was applied to the device. The light transmission in the visible region of the spectrum decreased from 73% to 9% for device No. 1 and from 72% to 10% for device No. 2. The colouring spread from the feed wire sides toward the middle. For both devices, the time it took to develop complete intensive blue colour was about 8 min. After reaching the steady-state conditions and keeping for 1 h, the voltage was switched off and the electrodes were short-circuited. The time it took to return into the initial (transparent) state was 15 min for device No. 1 and 10 min for device No. 2.

The application of a 3 V DC to parallel-coupled devices No. 1 and No. 2 generated uniform intensive blue colour after the steady-state conditions were attained. After threehour maintenance of the device in this electroactive state, a substantial portion of the window in device No. 1 was found to contain spots as brownish clots with brightened periphery, having a size ranging from fractions of a millimeter to several millimeters. The non-uniformity was more apparent during bleaching upon short-circuiting of the electrodes. More pronounced violation of the colouring/bleaching uniformity of device No. 1 was observed in the next colouring/bleaching cycle taking place on switching the another electrode polarity after long-term action of a higher voltage, as described above. Under similar polarization conditions (3 V for three hours), device No. 2 retained its initial properties, whereas the quality of device No. 1 was not restored even on subsequent long-term storage.

EXAMPLE 4

An electrochromic device with dimensions 75×100 cm$^2$ containing two optically transparent $SnO_2$ electrodes with a surface electric resistance of 18 ohm/m$^2$ and a glass substrate thickness of 4 mm (K-glass) was produced. The electrodes were glued together along the perimeter by two-sided adhesive tape VHB 4910 with a thickness of 1 mm and a width of 6 mm with two openings for filling the device with the electrochromic disperse system. Additionally, the device was glued along the outer perimeter with an epoxide-based adhesive in such a way that the total width of the glue line was 8 mm. The feed wires were positioned as in Example 3. The inner space of the device was filled, by injection, with the initial electrochromic composition representing a disperse system in the form of a suspension comprising the following components: a dispersion medium (electrochromic solution)—a solution of 0.01M 1,1'-dimethyl-4,4'-dipyridinium diperchlorate and 0.01M ferrocene in a mixture of γ-butyrolactone (60% vol.) and propylene carbonate (40% vol.); a disperse phase (20.5% wt)—the Vitan-2M copolymer. Prior to filling, the disperse system on the form of the suspension was evacuated for 15 min. After filling, the opening in the glue line was sealed with an inert sealing agent.

On the expiry of 30 min at a temperature of 60° C., the uniformly dim initial electrochromic composition became transparent without emerging any visible air bubbles and without volume shrinkage. The light transmission of the device in the visible region was 75%. The application of 1.7 V DC to the device induced intensive blue colouring that spread from the feed wire sides toward the middle. The time required for complete darkening till the lowest light transmission in the visible spectral range, namely 8%, was 9 min. After attaining the steady-state conditions, subsequent switching off the voltage and short-circuiting electrodes, the device returned to the initial (transparent) state. The complete bleaching state was attained in 15 min.

On storage of the device in the vertical position for 5 months at an ambient temperature and for 1 month at 65° C., no signs of fluidity of the electrochromic layer were detected. The possible deformation due to the hydrostatic pressure was checked by a strain gage, the accuracy of measurements being 5 μm.

EXAMPLE 5

An electrochromic device with dimensions 20×25 cm$^2$ comprising two optically transparent $SnO_2$ electrodes with a surface electric resistance of 18 ohm/m$^2$ and glass substrate thickness of 4 mm (K-glass) were produced. Bands of the conductive adhesive (a trade name NTK, the adhesive is manufactured under OST 107.46007.004-91) having a width of 2 mm and a thickness of 0.25 mm were applied along the edge of the longer sides of each electrode. To provide a sufficient electrical conductivity of the feed wires, a copper conductor of 0.2 mm in diameter was laid within the adhesive NTK layer and brought outside. The electrodes were glued together along the perimeter by an epoxide-based adhesive comprising spacers for forming an inter-electrode space of 0.8 mm in the device. In the glue line, which prevented the contact between the inner active layer and the preformed feed wires, two openings were left for filling the device, by injection, with the initial electrochromic composition which was a disperse system in the form of a suspension comprising the following components: a dispersion medium (electrochromic solution)—a solution of 0.015M 1,1'-dimethyl-4,4'-dipyridinium diperchlorate, 0.015M ferrocene, and 0.02M tetraethylammonium perchlorate in a mixture of γ-butyrolactone (50% vol.) and propylene carbonate (50% vol.); a disperse phase (20.5% wt)—the Vitan-2M copolymer. Prior to filling, the initial electrochromic composition was evacuated for 15 min. After filling, the opening in the glue line was sealed with an inert sealing agent.

On the expiry of about 20 min at a temperature of 60° C., the uniformly dim initial electrochromic composition in the device became transparent and homogeneous without volume shrinkage. The light transmission of the device in the visible spectral range was 76%, while that in the 300-400 nm range was 55%. On application of 1.5 V DC to the device, the light transmission in the visible spectral range decreased to 6%, while that in the near UV-range (200-300 nm) decreased to hundredths of percent. After switching-off the voltage and short-circuiting the electrodes, the device returned to the initial (transparent) state.

EXAMPLE 6

A device similar in design to the device described in Example 5 was produced. The inner space of the device was filled, by injection, with the initial electrochromic composition representing a disperse system in the form of a suspension comprising the following components: a dispersion medium—a solution of 0.01M 1,1'-dimethyl-4,4'-dipyridinium diperchlorate, 0.01M 5,10-dihydro-5,10-dimethylphenazine, and 0,02M tetraethylammonium perchlorate in a mixture of γ-butyrolactone (60% vol.) and propylene carbonate (40% vol.); a disperse phase (20.5% wt)—the Vitan-2M copolymer. Prior to filling, the initial electrochromic composition was evacuated for 15 min and the inner space of the device was purged with argon for 25 min. After filling, the opening in the glue line was sealed with an inert sealing agent. On the expiry of about 20 min at a temperature of 60° C., the uniformly dim initial electrochromic composition in the device became transparent and homogeneous without volume shrinkage. The layer of the electrochromic composition in the device was slightly yellowish.

On application of 4.5 V DC for 30 seconds to the device, the electrochromic composition rapidly acquired an intensive green colour being uniform over the window area, while short-circuiting of the electrodes resulted in disappearance of the electrically induced colour. The homogeneity of the electrochromic composition layer was not deteriorated and the initial yellowish shade disappeared.

The invention claimed is:

1. A method for producing an electrochromic device comprising at least two electrodes at least one of them is optically transparent, and a tightly closed space between the electrodes is filled with an electrochromic composition, the method including the steps of:

preparing the initial electrochromic composition in the form of an electrochromic disperse system comprising a suspension and/or a colloid, wherein a dispersion medium of said disperse system comprises an electrochromic solution comprising a liquid solvent, a cathodic component and an anodic component, and a disperse phase of said disperse system comprises finely dispersed polymer particles with a size of $6 \times 10^{-5}$ m and less;

deaerating the initial electrochromic composition to eliminate the dissolved oxygen and air introduced together with the finely dispersed polymer particles;

filling the closed space between the electrodes with the deaerated initial electrochromic composition; and sealing the closed space between the electrodes.

2. The method according to claim 1, wherein the electrochromic solution comprises an inert electrolyte additionally.

3. The method according to claim 2, wherein the electrolyte concentration is 0.005M-0.5M.

4. The method according to claim 1, wherein the step of deaerating of the initial electrochromic composition for eliminating dissolved oxygen and air introduced together with the finely dispersed polymer particles is performed by evacuation.

5. The method according to claim 1, wherein the polymer particles are in an amount that ensures forming a solid-like layer of the electrochromic composition.

6. The method according to claim 1, wherein the polymer is a linear polymer.

7. The method according to claim 6, wherein the linear polymer is a high-molecular polymer.

8. The method according to claim 7, wherein the highly-molecular linear polymer is a copolymer of methyl methacrylate and methacrylic acid and/or a copolymer of methyl methacrylate, methacrylic acid and calcium methacrylate.

9. The method according to claim 1, wherein the liquid solvent is an individual chemical compound or a mixture of chemical compounds.

10. The method according to claim 1, wherein the cathodic component is an individual organic electrochromic compound having at least one reversible reduction wave in a voltammogram or a mixture of organic electrochromic compounds that have at least one reversible reduction wave in a voltammogram, and the anodic component is an individual organic electrochromic compound having at least one reversible oxidation wave in a voltammogram or a mixture of organic electrochromic compounds that have at least one reversible oxidation wave in a voltammogram.

11. The method according to claim 10, wherein the concentrations of the cathodic and the anodic components are 0.001M-0.2M.

12. The method according to claim 11, wherein the preferable concentrations of the cathodic and anodic components are 0.01M-0.1M.

13. The method according to claim 10, wherein the cathodic component is a quaternary salt of dipyridinium or its derivatives or a mixture of salts.

14. The method according to claim 10, wherein the anodic component is a metallocene.

15. The method according to claim 14, wherein the anodic component is a ferrocene, its derivatives, or mixtures thereof.

16. The method according to claim 10, wherein the anodic component is 5,10-dihydro-5,10-dimethylphenazine, its derivatives, or mixtures thereof.

17. The method according to claim 1, wherein the dispersion medium is cooled prior to adding the disperse phase.

18. The method according to claim 1, wherein the closed space between the electrodes is deaerated prior to being filled with the deaerated initial electrochromic composition.

19. The method according to claim 18, wherein the deaeration of the closed space between the electrodes, before it is filled with the deaerated initial electrochromic composition, is performed by purging the space with an inert gas or by evacuation.

20. An electrochromic device including at least two electrodes at least one of them is optically transparent, and the space between the electrodes is tightly sealed and filled with an electrochromic composition, characterized in that the electrochromic composition is prepared by the method according to claim 1.

21. The electrochromic device according to claim 20, wherein the electrochromic composition comprises additionally an UV-stabilizing additive.

* * * * *